Figures 1, 2:
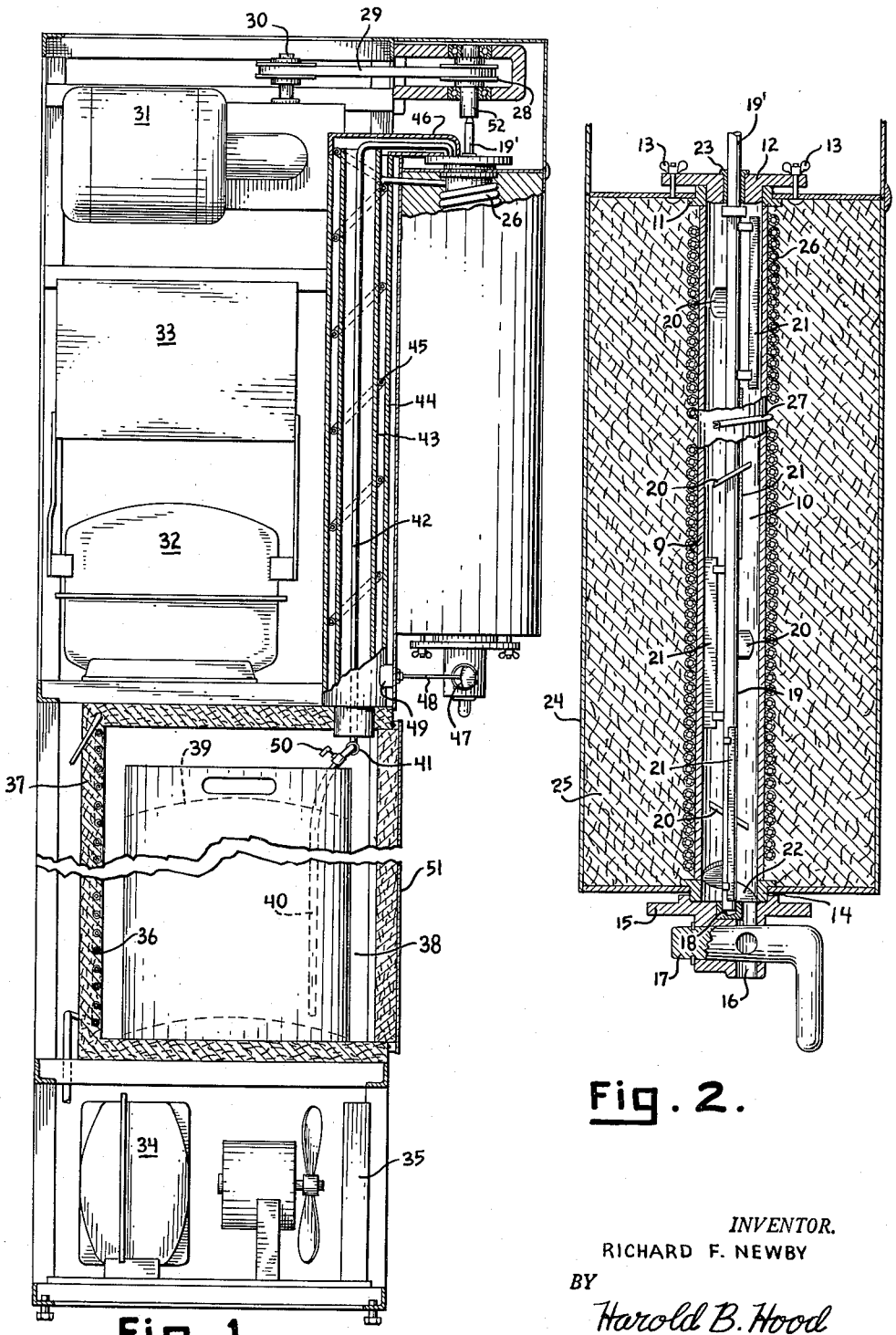

Oct. 17, 1961 R. F. NEWBY 3,004,404
APPARATUS FOR PRODUCING FROZEN CONFECTION
Filed May 15, 1959

INVENTOR.
RICHARD F. NEWBY
BY
Harold B. Hood
ATTORNEY 3,004,404
APPARATUS FOR PRODUCING FROZEN CONFECTION
Richard F. Newby, 2417 W. 12th St., Anderson, Ind.
Filed May 15, 1959, Ser. No. 813,437
1 Claim. (Cl. 62—342)

The present invention relates to a method of, and apparatus for, producing a frozen confection. The invention has been developed, and will be described, primarily in connection with the production of what is known in the trade as "soft ice cream" which is of a consistency well adapted to be directly dispensed from a freezing chamber into a cone, or the like, for immediate consumption; but as the description proceeds, it will be readily understood that the disclosed method and the illustrated apparatus may, without substantial modification, be used to produce other types of frozen confections.

The invention is primarily adaptable for use with mixtures whose principal ingredient is milk or a milk derivative, and I have used the term "lacteal-base mixture" to define such a composition broadly and to include mixtures in which such primary ingredient contains either larger or smaller proportions of the various components of milk required to meet statutory definitions of the term "ice cream," since the process and the apparatus of the present application are equally adapted for the production of "ice milk," frozen custards, mousses and the like as for the production of true ice cream. The invention is not limited, however, to use with such lacteal-base mixtures, but may be applied also to the preparation of ices, sherbets or "slushes." Neither is it limited to use in the preparation of relatively solidified confections, since it may be used in the direct preparation of "shakes" which are thin enough in consistency to be drunk rather than eaten, yet still fall within the category of "frozen confections," as understood in the trade. Still other frozen confections are known which, in finished form, have a texture and appearance similar to that of ice cream, but which contain little if any butter fat but instead utilize processed beef fat or vegetable oils. These, too, can be advantageously treated in accordance with the present invention.

Perhaps the primary distinguishing characteristic of a mixture for use in the preparation of frozen confections is the presence therein of some form of sugar and of gelatin or some other known type of stabilizer or emulsifier.

Herein, I have used the expression "frozen confection mix" to mean any of the above-described types of liquid mixtures characterized by the fact that, when subjected to temperatures within the range between 0 and 30° F., they tend to thicken and congeal without freezing to the consistency of a hard solid.

In substantially all procedures known for the preparation of frozen confections, it is conventional to aerate the mix during the freezing step, so that the volume of the finished product substantially exceeds the volume of the unfrozen, liquid mix; and for various reasons, a large increase in such volume is desirable. Such volume-increase is known in the trade as "overrun," and in the manufacture of different forms of confection, varying degrees of overrun within the range between 20% and 125% are desirable. In all processes heretofore known to me, the overrun has been achieved primarily, if not solely, by whipping, beating or churning the mix, while in the freezing chamber. Obviously, as the temperature of the mix falls, during its treatment in the freezing chamber, and as congelation begins, the mix becomes stiffer and stiffer whereby the load upon the beater element or elements is radically increased. As that load increases, and unless the beater element is excessively overpowered, the rate of movement of the beater element will be retarded whereby the rate of introduction of air into the mix is correspondingly retarded. The further the congelation step is carried, the more difficult it becomes to increase the amount of overrun and, as a matter of fact, as the temperature of the mix falls, it is found that the degree of overrun will likewise decline. Thus, specifically in connection with the preparation of soft ice cream, as defined above, it is found that if the conventional, large-volume freezing chamber is maintained at 18° Fahrenheit, the percentage of overrun in the final product will be approximately 35%; if the freezing chamber is maintained at 17° Fahrenheit, the overrun will be approximately 30%; if the temperature is held at 16° Fahrenheit, the overrun will be approximately 25% and if the freezing chamber is held at 15° Fahrenheit, the overrun will be approximately 10%.

Additionally, because of the load which is placed upon the whipper element as it strives to aerate the mix during congelation, the whipper and its driving train must be relatively large and rugged which means that the freezing chamber must be relatively large so that the difficulty of maintaining uniform temperature throughout the mass of material being frozen is increased and the cost of refrigerating the freezing chamber is likewise increased. Also, because a part of the relatively large volume of mix may remain in the freezing chamber for a relatively long time, a grainy consistency sometimes develops as a result of the formation of ice crystals in the material.

A primary object of the present invention, then, is to provide a method and apparatus through which a mixture to be frozen is aerated uniformly to a preselected degree of overrun before injection into the freezing zone, and is then frozen to a desired stage of stiffness or degree of congelation without any active beating or whipping during the freezing operation, and utilizing only such stirring action as may be required to achieve substantial uniformity of temperature throughout the body of mixture within the freezing zone.

A further object of the invention is to achieve the desired percentage of overrun in the liquid mix by charging the mix with an inert gas under pressure and then using the gas pressure to transport the mix from a charged reservoir to a freezing chamber wherein the gas distributed through the liquid mix is permitted to expand to some degree, and then freezing the mix, while maintaining a superatmospheric pressure thereon.

A still further object of the invention is to provide a method and apparatus under which the gas-charged mix enters an elongated freezing chamber adjacent one end of the chamber and is discharged, under a predetermined degree of congelation, through a discharge valve means adjacent the opposite end of the chamber, the freezing chamber being provided with means for continuing gentle agitation and blending of the mix while in the freezing chamber to facilitate the maintenance of uniform temperature throughout any cross section of the mass in the freezing chamber.

Another object of the invention is to provide a method and apparatus permitting the use of a freezing chamber of small dimensions in directions transverse to the direction of material movement therethrough, thus facilitating the extraction of heat from the mix, reducing the time during which the material must remain in the freezing chamber and guarding against the development of a grainy texture.

Still further objects of the invention will appear as the description proceeds.

To the accomplishment of the above and related objects, my invention may be embodied in the steps described in the following specification and in the form of apparatus illustrated in the accompanying drawings, attention being called to the fact, however that the drawings are illustrative only and that the specific procedure described is by way of illustration only and that change may be made in the specific construction illustrated and described or in the specific steps stated, so long as the scope of the appended claim is not violated.

FIG. 1 is a somewhat diagrammatic elevation of one form of apparatus well adapted to carry out the process of the present application, parts being broken away for clarity of illustration; and FIG. 2 is a vertical section through the freezing chamber and its associated housing, drawn to a somewhat enlarged scale.

In the illustrated apparatus, I provide an elongated tube 9 formed to define a freezing chamber 10 having a substantially cylindrical internal wall, the length of the chamber exceeding its transverse dimension in a ratio of at least 20:1. Preferably, but not necessarily, the tube is arranged on a vertical axis and at its upper end is provided with a head 11 which may be welded to the tube. A cap 12 has a fluid-tight fit in the head 11 and may be secured thereto by screws and wing nuts 13, or other equivalent fastening means. At its lower end, the tube 9 is provided with a similar head 14 which has a fluid-tight fit with a valve assembly 15 which may be similarly secured in place to seal the lower end of the chamber 10. The valve assembly is provided with a discharge passage 16 which may be controlled by any suitable form of discharge valve such as, for instance, the rotatable plug 17.

The assembly 15 also provides a journal seat 18 for the lower end of a rotor 19 which carries an interrupted conveyor flight 20, a plurality of axially-spaced and angularly-offset scrapers 21, and a short impeller section 22. The cap 12 is centrally perforated to receive a bushing 23 through which passes, with a fluid-tight seal, an extension 19' of the rotor 19.

Preferably, the tube 9 will be enclosed in a housing 24 packed with suitable heat-insulating material 25; and the tube is closely surrounded by a refrigerant coil 26. Preferably, a socket 27 is welded to the external surface of the tube 9 to receive a thermo-responsive bulb (not shown) of a conventional control means for the refrigeration system which supplies refrigerant to the coil 26.

Outside the freezing chamber, the rotor extension 19' is associated, through a separable coupling 52, with a sheave or sprocket 28 which, through a belt or chain 29, is adapted to be driven from the delivery shaft 30 of a motor-reducer set 31 of conventional type. The arrangement is such that, when the motor 31 is energized, the rotor 19 will be driven at approximately 125 r.p.m.

At 32, I have indicated a compressor of a conventional refrigeration system which includes a condenser 33 and which supplies the coil 26. The control circuits are preferably such that, whenever the compressor 32 is energized, the motor 31 will likewise be energized.

The illustrated apparatus includes a second refrigeration system comprising a compressor 34, a condenser 35 and a coil 36 which is arranged to maintain an optimum, subatmospheric temperature in a refrigerated cabinet 37 within which is stored a reservoir 38 having a fluid-tight, pressure-resistant, removable cap 39. Penetrating the cap 39 and extending to a point near the bottom of the reservoir 38, is a pipe section 40 which, at its upper end, is removably connected, through a separable joint 41, with a pipe section 42. At a point outside the reservoir, the pipe section 40 is provided with a manually manipulable cut-off valve 50 of any desired construction. The pipes 40 and 42 and the joint 41 constitute conduit means providing continuously-open communication between a point near the bottom of the reservoir 38 and the interior of the freezing chamber 10, the upper end of the pipe section 42 opening through a suitable port in the cap 12 and having a fluid-tight connection with said cap.

Thus, the reservoir 38 and such conduit means constitute the equivalent of an "aerosol" unit, it being understood that a suitable liquid mixture, under a suitable superatmospheric pressure of a non-toxic gas such as nitrous oxide is maintained in the reservoir. I presently believe that, after the unit 38 has been charged with a selected liquid and a suitable gas, and before it is put into use, it should be vigorously agitated to achieve a suitable impregnation or solution of gas in the liquid.

Preferably, a housing comprising concentric cylindrical walls 43 and 44 will enclose the major portion of the length of the pipe section 42, and a section 45 of the coil 26 will be arranged between the walls 43 and 44, whereby refrigeration of that portion of the mix which is contained in the pipe section 42 will be maintained. Preferably, the wall 44 removably carries a cap section 46 which envelops even the terminal portion of the pipe section 42 for the same reason.

As will be seen from FIG. 1, an end of the valve 17 is formed with a cam surface 47 against which bears an actuator rod 48 for a switch 49 connected in the energizing circuit for the motor 31, the arrangement being such that, when the valve is in closed position the motor will be deenergized (except when the compressor 32 is in operation); but when the valve is turned to open position, the rod 48 will be actuated to close the switch 49 and energize the motor 31 to drive the rotor 19, whether or not the compressor 32 is in operation.

It will be clear that, when the cap 12 and the valve assembly 15 are disassembled from the tube 9, the rotor 19 may be axially withdrawn from the tube, leaving the tube in open-ended condition for ready cleaning. Likewise, the sections 40 and 42 of the supply conduit means may be separated at the joint 41 whereupon the section 42 may be withdrawn from the housing 43, 44 by removal of the cap 46, and the section 40 may be either withdrawn from the cap 39 or may be cleaned while in association with that cap, after removal of the cap from the reservoir 38.

In use, a reservoir 38 will be charged with a predetermined quantity of a suitable liquid mixture for the preparation of a frozen confection, together with a precalculated amount of a suitable non-toxic gas under predetermined pressure; and the cap or lid 39 will be suitably sealed in place. The reservoir will be introduced into the cabinet 37 through its door 51 and the pipe section 40 will be connected to the section 42 through the joint 41. At this time, of course, the cap 12 and the valve mechanism 15 will have been operatively associated with the tube 9 and the rotor extension 19' will be connected, through the separable joint 52, to be driven by the sheave or sprocket 28.

Through operation of the refrigerating system 32, 33, 45, 26, the freezing chamber 10 will have been brought to a suitable temperature in the range between 0° and 30° F., and through operation of the system 34, 35, 36, the cabinet 37 will have been brought to a suitable refrigerating temperature in the range between 32° and 45° F.

Now, the valve 50 will be fully opened; whereupon the gas pressure in the reservoir 38 will force liquid mix through the conduit means 40, 42 into the freezing chamber 10 until the pressure in the freezing chamber approximates the pressure in the reservoir. As such movement of mix takes place, gasification of the mix results in expansion of its volume to produce a desired degree of overrun which, in the case of soft ice cream, will preferably be approximately 50–60%. The valve 17 is now opened to permit the discharge of a modicum of the mix from the freezing chamber and to complete the filling of the freezing chamber. Of course, as the relatively warm mix flows to the freezing chamber, the bulb in the pocket 27 will call for refrigeration and will energize the compressor 32 and the motor 31 so that the rotor 19 turns, whereby the scrapers 21 agitate the mix, moving portions thereof away from the wall of the freezing chamber and permitting new portions to come into contact therewith.

After the freezing chamber has become filled, the valve 17 is again closed and remains so until it is desired to dispense a portion of the frozen confection.

It has been found that, because the gasification of the mix to produce the desired degree of overrun occurs before the mix is introduced into the freezing chamber, and because there is no such beating of the mix within the freezing chamber as would be required to aerate the mix, a predetermined degree of overrun can be maintained almost without any regard to the temperature at which the freezing chamber is maintained. Experiments have shown, for instance, that an 80% overrun can be maintained in a soft ice cream mix at any temperature value within the range between 18° and 10° Fahrenheit, and it is believed that the same thing will be true anywhere within the range between 0° and 20° Fahrenheit.

Each time a quantity of frozen confection is dispensed by manipulation of the valve 17, the rotor 19 will operate during dispensing to scrape the freezer chamber walls, to blend the mix within the chamber and to move the mix downwardly toward and through the port 16. As a portion of frozen confection is withdrawn, the pressure within the freezing chamber temporarily drops to permit a corresponding quantity of the mix to be delivered from the reservoir 38 to the freezing chamber.

The small diametrical dimension of the chamber 10, made possible by the elimination of the necessity for beating the mix in the freezing chamber, of course accelerates the rate at which the temperature of the mix can be reduced in the freezing chamber to result in the desired congelation.

In the preparation of sherbets, ices, "slushes" etc., it is conventional practice to seek to attain an overrun of 20-30% and to hold the discharge temperature of the confection near 26-28 degrees F. The same conditions are also sought in the preparation of "shakes" which are usually dispensed in a condition just a little too thick to be drawn through a drinking straw but very promptly warm up, after being dispensed, to a consistency convenient for use of a straw. Conventionally, soft ice cream is dispensed at a temperature of 18-20 degrees F. and an overrun of approximately 35%; while hard ice cream is dispensed at about 23° F. and an overrun of 100% for bulk ice cream, or 85% for package ice cream.

When the present process is used with fat-containing mixes, it is found to be possible to pre-select any desired degree of overrun within the range between for instance, 20% and 125%, by properly proportioning the mix and the gas pressure in the reservoir, and maintain that degree of overrun regardless of the dispensing temperature within the range between 0 and 30 degrees F. Furthermore, it is found, particularly in the production of soft ice cream, that a product embodying an overrun of 50-60% can be dispensed at a temperature between 18 and 10 degrees F. and will have the appearance and texture of a similar product prepared according to conventional practices but embodying an overrun of only about 35%.

Sherbets prepared from mixes containing as little as 2% fat can maintain a 60% overrun when dispensed even at temperatures as low as 12° F.; and ices prepared from fat-free mixes containing conventional stabilizers or emulsifiers can maintain 15-20% overrun at corresponding temperatures.

From the standpoint of the producer, of course, this is a very important advantage of the present process, as is the fact that the process makes possible the attainment of any desired degree of overrun at any desired dispensing temperature within wide ranges.

I claim as my invention:

An apparatus of the class described, a cylindrical freezing chamber having a length:diameter ratio on the order of at least 20:1, said chamber having an inlet adjacent one end thereof and an outlet adjacent the other end thereof, manually-manipulable valve means for controlling flow through said outlet, refrigerant conduit means externally coiled about said chamber, a rotor having a portion concentrically and rotatably mounted within said chamber, a plurality of scraper blades carried by said rotor portion, each blade being elongated substantially in a plane including the axis of said rotor and bearing upon the internal wall of said chamber and said blades being axially and angularly spaced from each other relative to the axis of said rotor, a phase-change type refrigerating system connected to circulate refrigerant fluid through said refrigerant conduit and including an electric driving motor, thermo-sensitive means responsive to variations of temperature at said chamber and connected to control operation of said motor, a second electric motor connected to drive said rotor and automatically energized whenever said first-named motor is energized, means actuated by outlet-opening manipulation of said valve means to energize said second motor independently of said first-named motor, an "aerosol" type container charged with a liquid frozen confection mix gasified to a substantial superatmospheric pressure with an inert gas, and conduit means establishing open communication between the interior of said container, at a level below the surface of its charge, and the interior of said chamber.

References Cited in the file of this patent

UNITED STATES PATENTS

| | | |
|---|---|---|
| 651,412 | Bieder | June 12, 1900 |
| 1,548,430 | Ashley | Aug. 4, 1925 |
| 2,063,065 | Vogt | Dec. 8, 1936 |
| 2,064,597 | Engelmann | Dec. 15, 1936 |
| 2,409,067 | Reed | Oct. 8, 1946 |
| 2,713,253 | Chandler | July 19, 1955 |
| 2,882,827 | Conto | Apr. 21, 1959 |